INVENTORS
HAROLD B. WHITFIELD
THOMAS P. BENTLEY

United States Patent Office 3,842,152
Patented Oct. 15, 1974

3,842,152
EMBOSSED POLYESTER FILM PREPARATION
Harold B. Witfield, Jr., Circleville, Ohio, and Thomas P. Bentley, Wilmington, Del., assignors to E. I. du Pont de Nemours and Company, Wilmington, Del.
Continuation-in-part of application Ser. No. 65,291, Aug. 19, 1970, which is a continuation-in-part of application Ser. No. 985, Jan. 6, 1970, both now abandoned. This application Apr. 10, 1972, Ser. No. 242,817
Int. Cl. B29d 7/24
U.S. Cl. 264—210 R      8 Claims

ABSTRACT OF THE DISCLOSURE

Preparation of oriented polyester film having improved winding characteristics by embossing a pattern onto one side of the film subsequent to machine direction orientation and prior to transverse direction orientation, and the resulting film products.

CROSS-REFERENCE TO RELATED APPLICATIONS

This is a continuation-in-part of copending application Ser. No. 65,291, filed Aug. 19, 1970, which is a continuation-in-part of copending application Ser. No. 985, filed Jan. 6, 1970, both now abandoned.

BACKGROUND OF THE INVENTION

In the preparation of oriented polyester films, it is necessary that the completed film product exhibit winding characteristics that permit the high speed production of uniform, stable rolls. It has been found that satisfactory winding characteristics can be achieved by imparting a surface roughness to the film. Methods previously used to impart such surface roughness have included the addition of filler to the polymer blend, resulting in asperities on the surfaces of the finished film product. However, for certain specialized uses of polyester film, such as magnetic recording tape, the inclusion of a filler to impart sufficient surface asperities to provide satisfactory winding characteristics would create roughness on both sides of the film product that would interfere with the quality of the magnetic recording. Accordingly, still other attempts have been made to provide a roughness on only one surface of the finished film product, so as to leave one surface of the film in a relatively smooth configuration. Techniques for imparting a roughness to one surface of the film have included brushing or other post-treatment of the finished film or the extrusion of the film through a hopper die having one irregular lip. None of these techniques, however, have provided a commercially acceptable process which yields films having satisfactory winding characteristics combined with excellent magnetic recording performance.

SUMMARY OF THE INVENTION

The instant invention provides a process for the preparation of biaxially oriented polyester films having one smooth and one irregular surface and which exhibit substantially improved winding characteristics.

Specifically, the instant invention provides an improvement in the process for the preparation of biaxially oriented polyester film which comprises extruding a molten film-forming polymer onto a cool quenching surface, orienting the film by stretching in the machine direction and subsequently orienting the film by stretching in the transverse direction, which improvement comprises embossing one surface of the film after machine direction stretching and before transverse direction stretching by (a) heating the film to a temperature range R, between the second order transition temperature and about 60 centigrade degrees above the second order transition temperature, (b) bringing the film into contact with an embossing surface having a surface roughness of about from 30 to 500 microinches, A.A., and at a pressure of at least about 50 pounds per lineal inch, the embossing surface being heated to at least temperature range R, and (c) quenching the embossed film to below the second order transition temperature.

There is further provided a biaxially oriented polyester film having, on one surface thereof, a multiplicity of ridges oriented parallel to the transverse axis of the film, the ratio of ridge length to ridge width being at least about 2:1 the width of the ridge bases being greater than the height, and the peak-to-valley height of the ridges being at least about 10 microinches.

In a particularly preferred embodiment, the base-to-height ratio of the ridges is greater than about 100 and the Frustrated Total Reflectance of the embossed film surface is at least about 10%.

DESCRIPTION OF THE PREFERRED EMBODIMENTS

Figure 1:
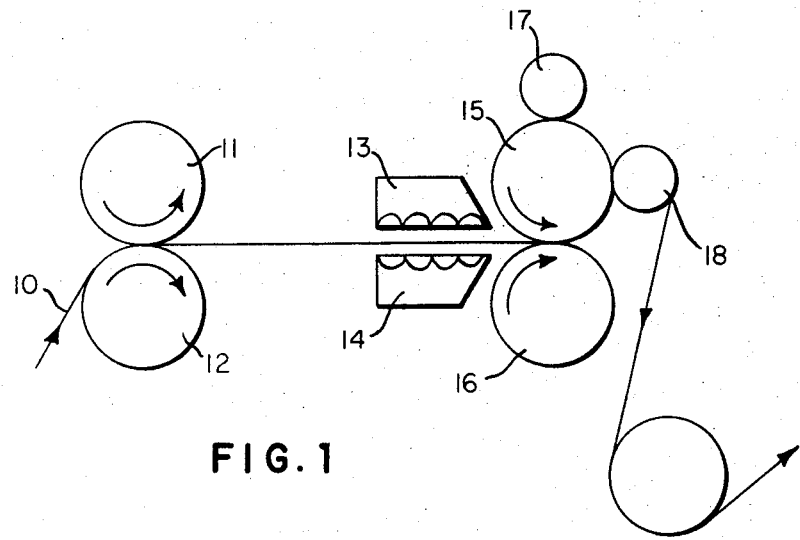
FIG. 1 is a schematic illustration of an apparatus that can be used in the present invention.

Apparatus which can be used in the process of the instant invention includes any conventional orientation mechanism in which an extruded film is first oriented in the machine direction and subsequently in the transverse direction. A typical apparatus which can be used is described in detail in U.S. Pat. 2,823,421, hereby incorporated by reference.

A machine direction orientation mechanism particularly preferred for use in the instant invention is described in U.S. Pat. 2,547,763, hereby incorporated by reference. The method described therein involves heating the extruded film to within the orientation temperature range and stretching it between two sets of nip rolls, operating at fast and slow speeds, respectively. Using the preferred polyethylene terephthalate films, it has been found that particularly satisfactory oriented products are obtained by stretching about 3× in the machine direction at a temperature of about from 110° to 120° C. and up to about 4.2× in the transverse direction at a temperature of about from 125° to 140° C. The biaxially oriented films are then generally heat set according to conventional techniques, for example, at temperatures of at least about 200° C.

In accordance with the process of the instant invention, the machine direction oriented film is embossed prior to transverse direction orientation. While the embossing can be effected at any point between the end of the machine direction orientation and the beginning of the transverse direction orientation, it has been found particularly desirable from the standpoint of apparatus efficiency to use as the embossing surface one of the fast nip rolls of an orientation apparatus of the type described in aforementioned U.S. Pat. 2,547,763.

The instant invention is applicable to polyester films including, for example, polyethylene-2,6-naphthalate, polyethylene-1,5-naphthalate, polyethylene terephthalate, and copolymers thereof containing up to about 5 mole percent of other ester-forming units such as diethylene glylcol, other polymethylene glycols having 1 to 10 carbon atoms, hexahydro-p-xylylene glycol, other aromatic dicarboxylic acids such as isophthalic acid, bibenzoic acid and p-terphenyl-4,4′-dicarboxylic acid, cycloaliphatic acids such as hexahydroterephthalic acid, or small amounts of aliphatic acids, such as adipic acid, or a hydroxy acid such as hydroxyacetic acid.

The second order transition temperature of a particular film can be determined by methods known to the art. U.S. Pats. 2,578,899 and 2,968,065, hereby incorporated by reference, respectively disclose a method for determining the second order transition temperature and representative temperatures for several thermoplastic films.

One technique found particularly convenient involves the use of a Du Pont 900 Differential Thermal Analyzer, equipped with a Differential Scanning Calorimeter cell. The specific procedures are outlined in Instruction Manual #5167 for the Du Pont 900 unit. The polyester sample and an inert reference material are heated under identical conditions and the temperature difference ($\Delta T$) between sample and reference are recorded. As the environmental temperature is changed, a thermogram of the $\Delta T$ as a function of environmental temperature is obtained on an X-Y recorder. Any physical or chemical change in the sample results in a positive or negative $\Delta T$ between sample and inert reference. These physical state changes, i.e., second order transition temperature, can be identified and measured. The absolute temperature for this change can be read from the X-Y chart as the "Extrapolated Onset Temperature" based on the environmental temperature. Specifically, the measurement is carried out over a temperature range of 25° C. to >90° C. and at a heating rate of 20° C./min. The measurement is obtained in duplicate for increased accuracy.

In accordance with the instant process, the film is heated to a temperature between the second order transition temperature and about 60 centigrade degrees above the second order transition temperatures. It has been found that temperatures higher than this range often render the film so fluid that it adheres to the surface of the nip or embossing rolls and higher temperatures also result in excessive crystallinity in the polymer film which interfers with subsequent transverse direction orientation. Temperatures below the second order transition temperature do not permit the permanent deformation of the one way oriented film. It is preferred that the temperature of the bulk of the film, at the middle of the embossing nip, be greater than about 20 centigrade degrees higher than the second order transition temperature. For most polyethylene terephthalate films, a film temperature at the center of the embossing nip of about from 100 to 120° C. has been found particularly satisfactory.

The film can be heated by any means adaptable to the particular orientation apapratus used. It has been found that radiant or infrared heaters positioned prior to the nip rolls on both sides of the film provide an effective means of heating the film to the desired embossing temperature range.

The embossing roll should be maintained at least at a temperature within the temperature range to which the film is heated, so as to prevent a temperature drop in the preheated film during embossing. The embossing roll can be heated above this temperature range to further elevate the film surface temperature by the momentary contact of the roll and film at embossing. However, the surface temperature of the film should generally not be raised more than about 100 centigrade degrees above the second order transition temperature. The elevated temperature of the embossing roll retains the plastic deformation of the film and heat sets the surface of the embossed film to prevent relaxation of the embossed pattern. The particular degree of preheating and the embossing roll temperature can vary, so long as the temperature of the bulk of the film at the center of the embossing nip is within the specified temperature range, and the surface or skin temperature at the embossing nip does not exceed about 100 centigrade degrees above the second order transition temperature. The film surface temperature can be calculated by conventional techniques considering variables such as specific polymers, temperature of the polymer and roll, speed of travel, and heat transfer rate.

The embossing surface can be prepared from any material sufficiently stable to retain its configuration at the required embossing temperatures and pressures. In general, metal surfaced rolls have been found most satisfactory in this application. The surface of the embossing roll can be conveniently prepared by blasting with sand, glass beads, aluminum oxide grit or shot to provide a surface blasted to the desired surface roughness. An embossing roll having a surface roughness of about from 150 to 350 microinches, A.A., provides a film product having exceptionally good winding performance in films having a final thickness of about 1.5 mils. A blasted steel surface for the embossing roll having been blasted and chrome plated to a surface roughness of about from 40 to 50 microinches, A.A, provides a significant winding improvement and is especially preferred for embossing applications in which two relatively smooth surfaces are required on the finished film product. In general, it is believed that a lower degree of surface roughness on the embossing roll will give a comparable improvement in winding characteristics with thinner gauge films.

The embossing roll surface roughness is measured by conventional techniques, using, for example, a "Gould" surfanalyzer at a 0.03-inch cutoff, according to American Standards (NASI) test B–46.1, 1962.

In those embodiments of the instant process wherein the embossing surface is one of a pair of nip rolls used in the machine direction stretching of the film, the pressure applied to the film is that which is sufficient to maintain a firm grip on the film in order to effect the desired degree of stretching. In general, a pressure along the nip of at least about 50 and preferably about 100 pounds per lineal inch can be used, although the particular pressure required will vary with the composition of the polymer, the thickness of the film, the rate of travel as well as the degree of stretch. The maximum pressure applied will similarly vary with film characteristics, but should not be so great as to cause an undesirably high degree of replication on the smooth side of the film or emboss the surface so deeply as to disturb the flat configuration of the ridges, as characterized by the required base-to-height ratio.

The second of the pair of nip rolls is generally a more resilient material than the embossing roll, such as a silicone rubber. Important characteristics of the second of the two nip rolls include sufficient rigidity to apply the embossing pressure and to impress the pattern to be embossed upon the film surface. The second roll is generally relatively smooth in order to provide one film surface relatively free from irregularities and asperities for the best possible performance as a magnetic tape base.

In a preferred embodiment of the instant invention, the second, backup, nip roll is cooled below the embossing temperature range in order to facilitate the rapid cooling of the film after embossing. The cooling of the backup roll can be effected by maintaining the backup roll in contact with an independent roll maintained at a substantially lower temperature.

Immediately after passing through the embossing nip, the embossed film is cooled below the second order transition temperature, and preferably below 70° C., in order to minimize relaxation of the embossed pattern. The film can be cooled by any cooling means adaptable to the particular stretching and embossing apparatus used to effect the instant process including, for example, a stream of refrigerated air directed toward the embossed film immediately outside of the embossing nip. It is preferred, however, that the embossed film be cooled by passing the embossed surface over a quench roll maintained at a temperature substantially below the second order transition temperature of the polymer. Quench roll temperatures of about 15° C. have been found particularly effective in minimizing the relaxation of the embossed pattern.

After the embossing and cooling steps, the film is oriented in the transverse direction according to methods conventionally used in the art.

The biaxialy oriented films of the instant invention exhibit one relatively smooth surface and a second surface having a pattern of ridges thereon. The ridges represent an elongation of the embossed pattern resulting from the transverse orientation of the film after embossing. Since the films are generally oriented in the transverse direction by stretching at least two times their original dimension, the ridges have length-to-width ratios of at least 2:1. The ridges should have a peak-to-valley height of at least about 10 microinches, and up to about 80 microinches when embossing rolls are used having a surface roughness of about 500 microinches, A.A. Preferably, the peak-to-valley height of the ridges is less than about 50 microinches. Films having been embossed with a 150-microinch A.A. surface typically exhibit peak-to-valley ridge heights of 15-25 microinches on the embossed surface. Typical ridges have peak-to-valley heights of about from 10 to 15 microinches.

A characteristic of the embossed surface of the present films that has been found important to their exceptional winding performance is the somewhat flat configuration of the ridges resulting from the embossing process. This is manifested in a base-to-height ratio of the ridges of at least about 100 and a Frustrated Total Reflectance of the embossed film surface of at least about 10%. It is believed that the winding performance of the present films is due to the combination of surface contact of the flat ridges and the transverse air passages provided by the valleys between the ridges.

The surface characteristics of the film product can be measured on a Taylor-Hobson Talysurf profile measuring instrument, which draws a stylus across the surface and records an accurately scaled profile on the surface on a moving recording chart. Using the recorded profile, the peak-to-valley heights can be readily measured by first drawing straight line segments to connect the major peaks in the profile. The depths of the valleys in the profile are then measured from this base line to obtain the peak-to-valley heights. The dimensions of the bases of the ridges are measured along the machine direction axis of the film, the measurements of these valleys along the transverse axis being substantially greater because of the transverse orientation after embossing. The base of the ridges is measured as the distance between the deepest impressions of successive valleys, discounting any flat area of the valley floor. These base measurements can be made either from the surface profiles or by direct measurement from photomicrographs. Using these measurements, the base-to-height ratio of the ridges is determined.

The Frustrated Total Reflectance represents the percent area of contact of the surface of a film onto a flat surface. This is measured by placing a film surface against a glass plate, using air pressure of 100 inches of water to hold the film against the glass with uniform pressure. A light beam is reflected back and forth within the glass plate at the critical angle for total internal reflection. When a film is placed against the glass, it makes optical contact at a number of points. At such points, the total internal reflectance of the light beam is frustrated, and the light exits from the glass. The amount of light leaving the glass in the presence of the film is measured with a photocell, from which the percentage of the surface in actual contact with the glass is calculated, and referred to herein as the Frustrated Total Reflectance.

The dual-surfaced films of the instant invention exhibit exceptionally good winding characteristics. A convenient measure of winding performance is obtained through the use of the Winding Slope of the film as described in copending, coassigned United States application Ser. No. 782,686, now U.S. Pat. 3,707,431, filed Dec. 10, 1968, hereby incorporated by reference. The winding slopes exhibited by the subject dual-surfaced films are exceptionally high, typically falling within the range of about 230 to 330. While the reason for the especially high winding slopes is not fully understood, it is believed to be a function of the transverse orientation of the pattern appearing on one surface of the films, the transverse ridges creating passageways for air between the surfaces of adjoining film layers, thus permitting adjustment between film surfaces on the formed roll. In addition, a minimum peak-to-valley height of the ridges of about 10 microinches has been found necessary for good winding performance.

An apparatus which can be used in the process of the instant invention is schematically illustrated in FIG. 1, wherein extruded film 10 is stretched in the machine direction by passing first through the nip formed by rolls 11 and 12, operating at a slow speed, and subsequently passing the film past radiant heaters 13 and 14, positioned on either side of the film. The heated film is then passed through the nip formed by rolls 15 and 16, moving at a speed faster than rolls 11 and 12, thus effecting a stretching of the film. The surface of roll 16 is blasted as previously described to emboss one surface of the preheated film. Roll 16 is also heated to a temperature of about 95° to 180° C. to effect a permanent deformation of the machine direction oriented film and simultaneously heat set the embossed pattern into the surface of the film. Roll 15 can have a silicone rubber finish and is preferably in contact with cooling roll 17 which is maintained at a temperature of about 15° C. The cooling roll maintains the surface of roll 15 at a temperature lower than the surface of roll 16. Typical surface temperatures of roll 15 when in contact with cooling roll 17 are about 90° C. An embossing pressure of about 100 pounds per lineal inch is applied to the nip along the heated film at the nip gap.

The quench roll 18 is positioned adjacent roll 15 to quench the embossed surface of the machine direction oriented film and simultaneously remove the embossed film from the surface of the nip roll. The quench roll is generally maintained at a temperature of about 15° C. The film is then oriented in the transverse direction according to conventional techniques.

The embossed films of the present invention, by virtue of their single roughened surface, exhibit excellent winding characteristics that have heretofore been available primarily through the use of particulate fillers. Accordingly, the quantities and particle size of fillers used in polyester films can be substantially reduced without impairing the winding characteristics of such films. This permits the preparation of films having good windability for certain recording applications having particularly exacting smoothness requirements for one surface of the recording tape base. Through the use of the present invention, films can be prepared having one smooth surface on which the average peak-to-valley height of the irregularities is less than about 10 microinches, A.A.

The films of the present invention, when used as a magnetic recording base, provide several specific advantages over similar base films filled with a large percentage of particulate additive. The films of the present invention, when used as a recording base, can be stopped and started on conventional recording winding equipment substantially faster than conventional films. Reels of the present films, when heated in an oven at 55° C. for five days, retain the original tightly wound configuration of the original roll, as opposed to intermittent loosening or buckling on the reel that is characteristic of previous commercially used recording bases. In high speed winding of the present polyethylene terephthalate embossed films, the frequency of intermittently non-aligned film layers is markedly reduced. In addition, the present films exhibit excellent abrasion resistance.

The instant invention is further illustrated by the following specific examples.

EXAMPLE 1

A polyethylene terephthalate film is oriented by stretching between two sets of nip rolls moving at different speeds, in an apparatus similar to that illustrated in the Figure. The film is heated by infrared heaters to a temperature of about 100° C.

Nip roll 16 is a steel roll which, having been blasted with "Crystalon" 90 mesh aluminum oxide grit, has a maximum surface variation, peak-to-valley, of 200 microinches and exhibits a surface roughness of about from 40 to 50 microinches, A.A. The nip roll is maintained at a surface temperature of 120° C.

The machine direction oriented film, having a thickness of about 3 mils, is passed through the nip between rolls 15 and 16 at a pressure of about 100 pounds per lineal inch and a speed of about 68 feet per minute. The second nip roll 15 is surfaced with a silicone rubber, and is in contact with quench roll 17 to give the nip roll a surface temperature of about 90° C.

After passing through the embossing nip, the film is removed from roll 15 by quench roll 18 maintained at a temperature of about 15° C. After quenching, the pattern replicated onto the embossed surface of the machine direction oriented film exhibits a roughness of about 55 microinches in peak-to-valley dimension. The film is then reheated and oriented in the transverse direction to give a final biaxially oriented film product having one smooth surface and one embossed surface characterized by transverse ridges having a height of 10 to 15 microinches.

The biaxially oriented film has exceptionally good winding characteristics, exhibiting winding slopes of 230 to 330.

EXAMPLE 2

The general procedure of Example 1 is repeated. Polyethylene terephthalate, having been prepared using zinc and antimony catalysts, containing about 0.3% by weight of a finely ground inorganic particulate additives, and having a second order transition temperature of about 77 to 78° C., is biaxially oriented. The film is first oriented by stretching about 3.0× in the machine direction at a temperature of 114° C. The film is then stretched about 3.9× in the transverse direction at a temperature of 135° C. and thereafter heat set at a temperature of 200° C.

Nip roll 16 exhibits a surface roughness of about 300 microinches, A.A., having been blasted with aluminum oxide grit having a U.S. sieve size of 24. The embossing roll is maintained at a temperature of about 170° C. and the surface of the rubber roll forming the second roll of the nip is maintained at about 85° C. The film is passed through the nip at a pressure of about 120 pounds per lineal inch and a speed of about 230 feet per minute. The average film temperature at the center line of the embossing nip is calculated to be 115° C., with the skin temperature being about 12° higher. Quench roll 18 is maintained at a temperature of about 16° C.

The embossed, biaxially oriented film is characterized by one relatively smooth surface in which the average peak-to-valley height of the surface variations is about 8.6 microinches, and one embossed surface characterized by a multiplicity of ridges having an average peak-to-valley height of about 35 microinches. The base-to-height ratio of the ridges, as measured in the machine direction, is about 200 and the film exhibits a Frustrated Total Reflectance of about 24%.

The embossed, oriented film is used as a base for a magnetic recording tape, and the winding characteristics of the recording tape are evaluated. Tape prepared from the present embossed film is compared to that prepared from unembossed oriented polyethylene terephthalate having a higher concentration of particulate additive commercially available from E. I. du Pont de Nemours and Company as "Mylar" 142 PB. Magnetic recording tapes prepared from the present embossed films exhibit a marked improvement in cinch resistance, uniform roll formation and shorter start and stop times.

The coefficient of friction of the embosed, oriented film is measured by wrapping a one inch wide film around a cylinder which rotates at 0.1 cm./sec. A second sample, ½ inch wide, is draped over the cylinder. One end of the first sample is connected to a force measuring cell, and the other end hangs free with a 50 gram weight attached. The cylinder is rotated mechanically, and the tension level just prior to slip is read from the force cell on a recording chart. The coefficient of friction is calculated from the equation $\mu\theta = T/F$ $e$ is the base of Naperian logarithms, $\mu$ is the friction coefficient, $\theta$ is the wrap angle in radians, T is the measured force, and W is the attached weight. The various surfaces of the film can be measured depending upon which surfaces are matching, i.e., rough-smooth, smooth-smooth, etc. The coefficients of friction is found to be 0.5 (smooth-smooth) and 0.8 (smooth-rough).

Figure 2:
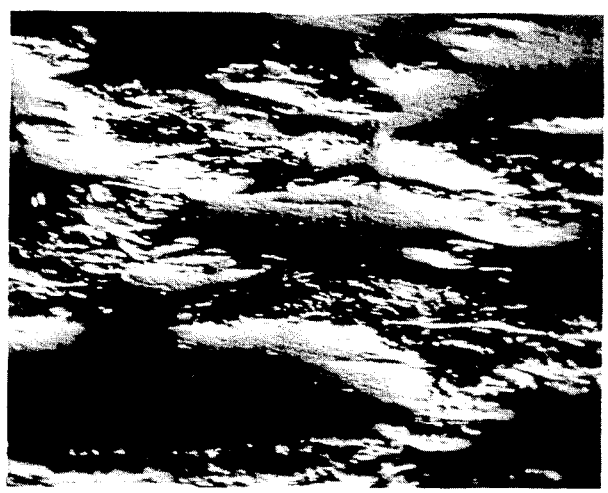
FIG. 2 is a photomicrograph of the surface of a film of the invention, taken at a magnification of 134×.

The embossed surface of the film is photographed at a magnification of 134×, which photograph appears as FIG. 2.

We claim:
1. A process including the steps of:
   extruding a molten film-forming polymer onto a cool quenching surface;
   stretching the film in the machine direction;
   embossing one surface of the film after machine direction stretching and before transverse direction stretching in a manner whereby to permanently deform one surface of such film by
   (a) heating the film to a temperature range R, between the second order transition temperature and about 60 centigrade degrees above the second order transition temperature,
   (b) bringing only such one surface of the film into momentary contact with an embossing surface having a surface roughness of about from 30 to 500 microinches, A.A., and at a pressure of at least about 50 pounds per lineal inch, the embossing surface being heated to at least temperature range R, and
   (c) quenching the embossed film to below the second order transition temperature; and
   stretching the permanently deformed film up to about 4.2X in the transverse direction whereby to prepare a biaxially oriented film having one smooth and one irregular surface, such irregular surface having a pattern of flat ridges thereon resulting from the transverse orientation of the film after embossing whereby to improve winding properties of such film.

2. A process of Claim 1 wherein the film is oriented in the machine direction between two sets of nip rolls moving at a slow and a fast speed, respectively, and wherein the embossing surface is one of the set of nip rolls moving at the fast speed.

3. A process of Claim 1 wherein the embossing surface has a surface roughness of about from 150 to 350 microinches, A.A.

4. A process of Claim 1 wherein the embossing surface consists of a steel roll having been blasted to a surface roughness of about from 30 to 60 microinches, A.A., and a peak-to-valley roughness of about 200 microinches.

5. A process of Claim 1 wherein the embossing surface is heated so as to raise the surface temperature of the film to up to 60 centigrade degrees above the second order transition temperature.

6. A process of Claim 1 wherein the film is brought into contact with the embossing surface at a pressure of at least about 100 pounds per lineal inch.

7. A process of Claim 2 wherein the polyester is polyethylene terephthalate.

8. A process of Claim 7 wherein the temperature of the film at the center of the embossing nip is about 110° C.

References Cited

UNITED STATES PATENTS

| 3,254,148 | 5/1966 | Nichols | 264—289 |
| 3,309,452 | 3/1967 | Yumoto et al. | 264—284 |
| 2,928,124 | 3/1960 | Hugger | 264—284 |
| 3,060,515 | 10/1962 | Corbett | 264—284 |

FOREIGN PATENTS

| 757,548 | 4/1967 | Canada | 264—284 |
| 883,396 | 11/1961 | Great Britain | 264—284 |

JEFFERY R. THURLOW, Primary Examiner

U.S. Cl. X.R.

264—284, 289